US012583286B2

(12) United States Patent
Ok et al.

(10) Patent No.: US 12,583,286 B2
(45) Date of Patent: Mar. 24, 2026

(54) HEAT MANAGEMENT SYSTEM FOR VEHICLE

(71) Applicant: VOLVO CONSTRUCTION EQUIPMENT AB, Eskilstuna (SE)

(72) Inventors: Dongcheol Ok, Gyeongsangnam-do (KR); Donguk Choi, Gyeongsangnam-do (KR); Keunhyuk Karl, Gyeongsangnam-do (KR); Gyeongmo Min, Busan (KR); Dongmyoung Choi, Gyeongsangnam-do (KR)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 273 days.

(21) Appl. No.: 18/556,428

(22) PCT Filed: Apr. 23, 2021

(86) PCT No.: PCT/KR2021/005132
§ 371 (c)(1),
(2) Date: Oct. 20, 2023

(87) PCT Pub. No.: WO2022/225085
PCT Pub. Date: Oct. 27, 2022

(65) Prior Publication Data
US 2024/0198763 A1 Jun. 20, 2024

(51) Int. Cl.
*B60H 1/00* (2006.01)
*B60H 1/22* (2006.01)
(Continued)

(52) U.S. Cl.
CPC ..... *B60H 1/00885* (2013.01); *B60H 1/00278* (2013.01); *B60H 1/00485* (2013.01);
(Continued)

(58) Field of Classification Search
CPC ............ B60H 1/00885; B60H 1/00278; B60H 1/00485; B60H 1/00571; B60H 1/2221;
(Continued)

(56) References Cited

U.S. PATENT DOCUMENTS 4,006,595 A * 2/1977 Forbes .................... F01K 25/10
60/516
4,286,551 A * 9/1981 Blitz ........................ F01P 11/20
123/41.31
(Continued)

FOREIGN PATENT DOCUMENTS

JP        2020-002932 A      1/2020
JP        2020-185880 A     11/2020
(Continued)

OTHER PUBLICATIONS

English Translation of the International Search Report for International Application No. PCT/KR2021/005132, mailed Jan. 10, 2022, 8 pages.

*Primary Examiner* — Ljiljana V. Ciric
(74) *Attorney, Agent, or Firm* — Sage Patent Group

(57) ABSTRACT

A vehicle thermal management system includes a first coolant loop that passes through a battery and a first valve. A second coolant loop passes through a heater, a cabin, and a second valve. A first connecting path connects the first valve and a second point of the second coolant loop. A second connecting path connects the second valve and a first point of the first coolant loop. The first valve selectively allows coolant to circulate through the first coolant loop or flow to the second point 280 through the first connecting path. The second valve selectively allows coolant to circulate through the second coolant loop or flow to the first point 180 through the second connecting path. A second cooling (Continued)

unit cools the cabin. The first coolant loop additionally passes through a first cooling unit.

15 Claims, 10 Drawing Sheets

(51) Int. Cl.

| | |
|---|---|
| *B60H 1/32* | (2006.01) |
| *B60K 11/02* | (2006.01) |
| *F01P 3/12* | (2006.01) |
| *F01P 5/10* | (2006.01) |
| *F01P 7/14* | (2006.01) |
| *F01P 7/16* | (2006.01) |
| *F01P 11/02* | (2006.01) |

(52) U.S. Cl.
CPC ....... *B60H 1/00571* (2013.01); *B60H 1/2221* (2013.01); *B60K 11/02* (2013.01); *B60H 2001/00307* (2013.01); *B60H 2001/00949* (2013.01); *B60H 2001/2253* (2013.01); *B60H 2001/3269* (2013.01); *B60H 2001/3289* (2013.01); *F01P 3/12* (2013.01); *F01P 2005/105* (2013.01); *F01P 2007/146* (2013.01); *F01P 7/165* (2013.01); *F01P 11/029* (2013.01); *F01P 2060/08* (2013.01)

(58) Field of Classification Search
CPC ........... B60H 2001/00307; B60H 2001/00949; B60H 2001/2253; B60H 2001/3269; B60H 2001/3289; B60H 1/32281; B60K 11/02; F01P 3/12; F01P 7/165; F01P 11/029; F01P 2005/105; F01P 2007/146; F01P 2060/08; F01P 5/10; F01P 2025/08
See application file for complete search history.

(56) References Cited

U.S. PATENT DOCUMENTS

| | | | | |
|---|---|---|---|---|
| 4,338,891 | A * | 7/1982 | Blitz | B60H 1/00492 123/41.31 |
| 5,291,960 | A * | 3/1994 | Brandenburg | B60W 10/26 123/41.14 |
| 5,537,956 | A * | 7/1996 | Rennfeld | B60L 3/0061 123/41.31 |
| 5,971,290 | A * | 10/1999 | Echigoya | B60H 1/03 237/12.3 A |
| 6,006,731 | A * | 12/1999 | Uzkan | F02B 29/0443 60/599 |
| 6,138,466 | A * | 10/2000 | Lake | B60H 1/00392 62/238.7 |
| 6,186,254 | B1 * | 2/2001 | Mufford | H01M 8/04723 429/465 |
| 6,743,539 | B2 * | 6/2004 | Clingerman | H01M 8/04358 123/41.12 |
| 6,797,421 | B2 * | 9/2004 | Assarabowski | H01M 8/2475 429/441 |
| 6,862,892 | B1 * | 3/2005 | Meyer | B60H 1/00892 62/238.7 |
| 7,147,071 | B2 * | 12/2006 | Gering | B60H 1/08 165/41 |
| 7,455,136 | B2 * | 11/2008 | Pleune | B60K 11/04 165/41 |
| 7,789,176 | B2 * | 9/2010 | Zhou | B60H 1/00885 180/65.1 |
| 7,841,431 | B2 * | 11/2010 | Zhou | B60L 58/26 180/65.1 |
| 7,975,757 | B2 * | 7/2011 | Nemesh | H01M 10/6568 165/42 |
| 8,336,319 | B2 * | 12/2012 | Johnston | B60K 11/04 62/434 |
| 8,402,776 | B2 * | 3/2013 | Johnston | B60L 50/40 62/79 |
| 9,321,325 | B2 * | 4/2016 | Zhang | F25B 13/00 |
| 9,533,546 | B2 * | 1/2017 | Cheng | H01M 10/625 |
| 9,533,547 | B2 * | 1/2017 | Cheng | H01M 10/663 |
| 9,649,909 | B2 * | 5/2017 | Enomoto | B60W 10/30 |
| 9,707,822 | B2 * | 7/2017 | Cheng | B60K 11/085 |
| 10,125,664 | B2 * | 11/2018 | Kim | F01P 7/165 |
| 10,525,787 | B2 * | 1/2020 | Cheng | B60H 1/2218 |
| 10,850,590 | B2 * | 12/2020 | Lee | B60H 1/00885 |
| 10,946,713 | B2 * | 3/2021 | Seki | B60H 1/00328 |
| 10,967,702 | B2 * | 4/2021 | Mancini | B60H 1/00564 |
| 10,987,998 | B2 * | 4/2021 | Kim | B60H 1/00278 |
| 11,186,137 | B2 * | 11/2021 | Kim | B60H 1/32284 |
| 11,309,559 | B2 * | 4/2022 | Li | B60H 1/00278 |
| 11,358,435 | B2 * | 6/2022 | Kim | B60H 1/3227 |
| 11,458,812 | B2 * | 10/2022 | Jeong | B60H 1/00921 |
| 11,479,082 | B2 * | 10/2022 | Chatham | B60H 1/00328 |
| 11,560,042 | B2 * | 1/2023 | Brown | F25B 5/02 |
| 11,654,744 | B2 * | 5/2023 | Kim | B60H 1/00821 62/159 |
| 11,739,994 | B2 * | 8/2023 | Chatham | B60H 1/00921 62/238.7 |
| 11,870,045 | B2 * | 1/2024 | Kim | H01M 10/6569 |
| 11,898,657 | B2 * | 2/2024 | Schoeneman | F01P 7/165 |
| 12,054,033 | B2 * | 8/2024 | Brown | B60H 1/323 |
| 12,179,558 | B2 * | 12/2024 | Turudic | B60L 15/02 |
| 12,251,986 | B2 * | 3/2025 | Mehta | B60H 1/00899 |
| 12,358,345 | B2 * | 7/2025 | Wiland | B60H 1/00278 |
| 12,479,263 | B2 * | 11/2025 | Hu | B60H 1/00278 |
| 12,508,873 | B2 * | 12/2025 | Cho | B60H 1/00899 |
| 2002/0043413 | A1 * | 4/2002 | Kimishima | B60K 6/40 903/903 |
| 2003/0134168 | A1 * | 7/2003 | Assarabowski | H01M 8/04022 429/429 |
| 2005/0039878 | A1 * | 2/2005 | Meyer | F25B 29/003 62/324.1 |
| 2005/0133215 | A1 * | 6/2005 | Ziehr | B60L 58/27 62/238.7 |
| 2008/0251235 | A1 * | 10/2008 | Zhou | B60L 58/26 165/59 |
| 2017/0021698 | A1 * | 1/2017 | Hatakeyama | B60H 1/143 |
| 2018/0001746 | A1 * | 1/2018 | Vehr | B60H 1/3226 |
| 2020/0398642 | A1 | 12/2020 | Kim | |
| 2022/0052390 | A1 * | 2/2022 | Kim | H01M 10/663 |
| 2022/0111698 | A1 * | 4/2022 | Kim | B60H 1/00007 |
| 2022/0134840 | A1 * | 5/2022 | Evans | B60H 1/00342 62/117 |
| 2023/0226877 | A1 * | 7/2023 | Hu | H01M 10/6568 62/79 |
| 2024/0149637 | A1 * | 5/2024 | Yin | B60H 1/00899 |
| 2024/0198763 | A1 * | 6/2024 | Ok | B60K 11/02 |

FOREIGN PATENT DOCUMENTS

| | | | |
|---|---|---|---|
| KR | 10-2019-0097262 A | 8/2019 | |
| KR | 10-2020-0078000 A | 7/2020 | |
| WO | WO-2022005373 A1 * | 1/2022 | B60K 11/02 |

* cited by examiner

HEAT MANAGEMENT SYSTEM FOR VEHICLE

CROSS REFERENCE TO RELATED APPLICATIONS

This application is a 35 U.S.C. § 371 national stage application of PCT International Application No. PCT/KR2021/005132 filed on Apr. 23, 2021, the disclosure and content of which is incorporated by reference herein in its entirety.

TECHNICAL FIELD

The present disclosure relates to a vehicle thermal management system and, more particularly, to a vehicle thermal management system configured to integrally manage heating and/or cooling of a battery and a cabin of a vehicle.

BACKGROUND

Fabrication and sales of electric vehicles powered partially or entirely by batteries are rapidly increasing, replacing conventional vehicles powered by an internal combustion engine. The efficiency of a battery acting as a power source of such a vehicle is sensitively affected by the temperature of the battery. Thus, such a vehicle may be provided with a battery thermal management system to maintain the temperature of the battery at an appropriate level.

In addition, in order to provide comfort to the driver of a vehicle in summer or winter, the vehicle may also be provided with a cabin thermal management system to provide cooling and heating to a passenger space or a vehicle cabin in which the driver and passengers of the vehicle.

Conventionally, such battery thermal management system and cabin thermal management system exist separately, and thus power consumption efficiency for thermal management is not satisfactory. In addition, each thermal management system has a large number of components, leading to an increase in manufacturing costs.

SUMMARY

Various aspects of the present disclosure aim to integrate a battery thermal management system and a cabin thermal management system to improve power consumption efficiency and reduce manufacturing costs by reducing the number of components.

According to an aspect, a vehicle thermal management system may include: a first coolant loop configured to pass through a battery supplying power to a vehicle and a first valve; a second coolant loop configured to pass through a heater, a cabin in which a driver of the vehicle sits, and a second valve; a first connecting path connecting the first valve and a second point of the second coolant loop; and a second connecting path connecting the second valve and a first point of the first coolant loop.

In some embodiments, the first valve may selectively allow coolant to either circulate through the first coolant loop or flow to the second point through the first connecting path.

In some embodiments, the second valve may selectively allow coolant to either circulate through the second coolant loop or flow to the first point through the second connecting path.

In some embodiments, the vehicle thermal management system may further include a second cooling unit configured to cool the cabin.

In some embodiments, the first coolant loop may be configured to additionally pass through a first cooling unit.

According to embodiments, the present disclosure may integrate a battery thermal management system and a cabin thermal management system to improve power consumption efficiency and reduce manufacturing costs by reducing the number of components.

DETAILED DESCRIPTION

Hereinafter, embodiments of the present disclosure will be described in detail with reference to the accompanying drawings.

A thermal management system according to the present disclosure relates to a thermal management system for a vehicle powered entirely or partially by a battery 110. The vehicle includes a variety of working machines, such as an excavator, configured to perform work.

Figure 1:
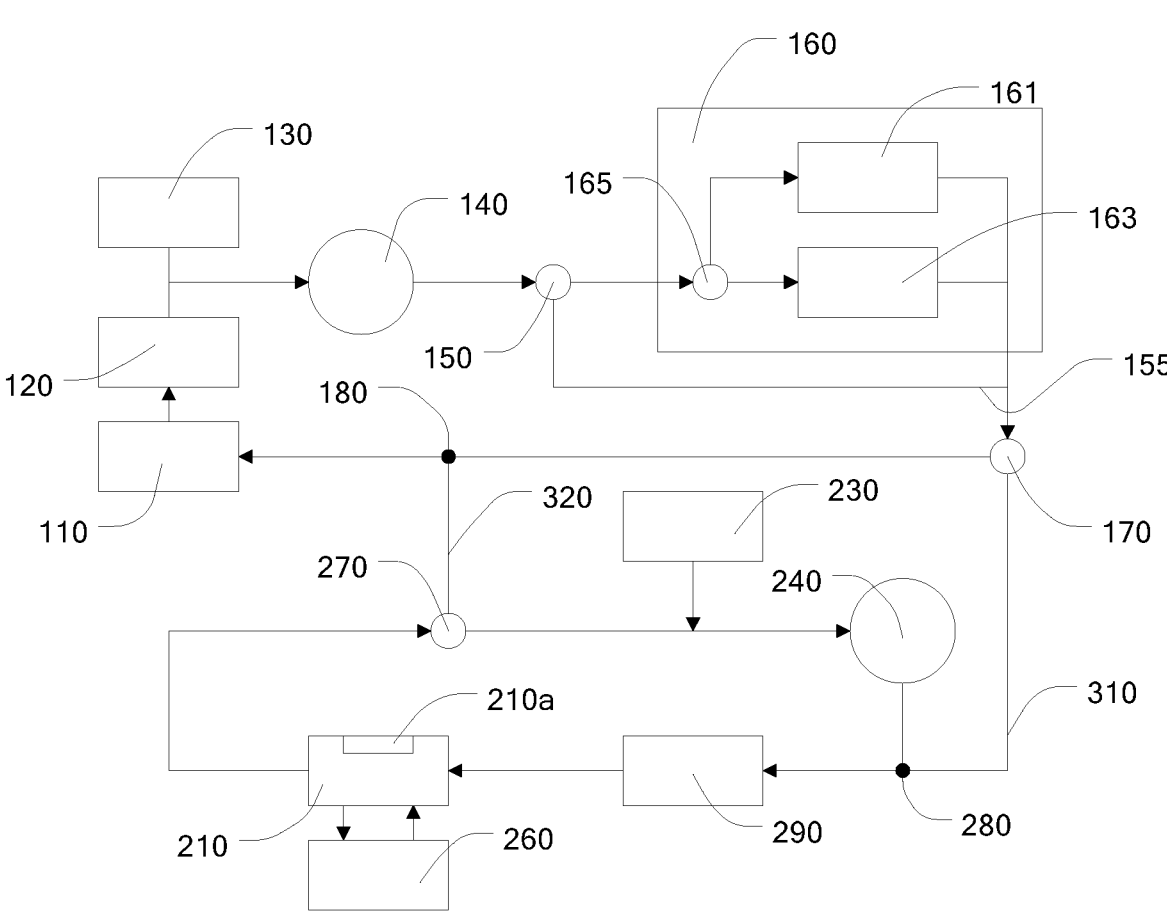
FIG. 1 is a diagram schematically illustrating the structure of an integrated thermal management system according to an embodiment of the present disclosure.

FIG. 1 is a block diagram schematically illustrating the structure of an integrated thermal management system according to an embodiment of the present disclosure.

The thermal management system may include a first coolant loop and a second coolant loop through which coolant circulates.

The first coolant loop may be configured to pass through the battery 110 by which a vehicle is powered and a first valve 170. Coolant may circulate through flow paths of the first coolant loop. Coolant may heat or cool the battery 110 by heat exchange with the battery 110 while passing through the battery 110. In addition, the first coolant loop may be configured to pass through a first pump 140. The first pump 140 causes coolant to circulate. A controller to be described below may control the speed of circulation of coolant by controlling the first pump 140. In addition, the first coolant loop may be configured to pass through a battery charger 120 configured to charge the battery. In some embodiments, the battery charger 120 may be an onboard charger. In addition, the first coolant loop may be configured to pass through a first cooling unit 160 configured to cool coolant.

The second coolant loop may be configured to pass through a cabin 210 or a boarding space in which the driver of the vehicle sits, a second valve 270, and a heater 290 configured to heat coolant. Coolant may circulate through flow paths of the second coolant loop. Coolant may heat the cabin 210 by heat exchange with the cabin 210 while passing through the cabin 210. In addition, the second coolant loop may be configured to pass through a second pump 240. The second pump 240 causes coolant to circulate. The controller may control the speed of circulation of coolant by controlling the second pump 240.

The thermal management system may include a first tank 130 configured to supply coolant to the first coolant loop and/or store the coolant by recovering the coolant from the first coolant loop. In addition, the thermal management system may include a second tank 230 configured to supply coolant to the second coolant loop and/or store the coolant by recovering the coolant from the second coolant loop.

In addition, the first coolant loop may be configured to pass through a third valve 150 disposed upstream of the first cooling unit 160.

The thermal management system may include a second cooling unit 260 to cool the cabin 210. In some embodiments, the second cooling unit 260 is provided separately from the second coolant loop so that coolant does not pass through the second cooling unit 260. In some embodiments, the second cooling unit 260 may be an air conditioning system, but the present disclosure is not limited thereto.

In addition, the thermal management system may include a first connecting path 310 connecting the first valve 170 and a second point 280 of the second coolant loop. In addition, the thermal management system may include a second connecting path 320 connecting the second valve 270 and a first point 180 of the first coolant loop.

In addition, the thermal management system may include the controller to control the first valve 170, the second valve 270, and the like.

In some embodiments, the thermal management system may include a sensor to measure the temperature of the battery 110. In addition, the thermal management system may include a sensor to measure the room temperature of the cabin 210. The sensors may transmit measured temperature information to the controller, and the controller may perform controlling according to the temperatures measured by the sensors. For example, when the temperature of the battery 110 measured by the sensor is higher than a predetermined optimal maximum temperature, the controller may perform controlling to cool the battery 110. When the temperature of the battery 110 is lower than the predetermined optimal maximum temperature, the controller may perform controlling to heat the battery 110. In addition, for example, when the room temperature of the cabin 210 measured by the sensor is higher than a predetermined maximum temperature, the controller may perform controlling to cool the cabin 210. When the room temperature of the cabin 210 is lower than the predetermined maximum temperature, the controller may perform controlling to heat the cabin 210.

Together with or in place of the sensors, in some embodiments, the thermal management system may include an input interface to receive heating/cooling commands from the driver. For example, the driver may input a command requesting the cabin 210 to be cooled or heated by means of the input interface, by which the command may be transmitted to the controller. In addition, for example, in winter or summer, the driver may input a command requesting the battery 110 to be heated or cooled by means of the input interface, by which the command may be transmitted to the controller.

In some embodiments, the first valve 170 may selectively have at least a first position and a second position. When the first valve 170 is in the first position, the first valve 170 may allow coolant to circulate through the first coolant loop. That is, referring to FIG. 1, a flow path toward the battery 110 may be opened, while communication with the first connecting path 310 may be locked. In contrast, when the first valve 170 is in the second position, the first valve 170 may allow coolant to flow toward the second point 280 through the first connecting path 310, That is, referring to FIG. 1, a flow path toward the battery 110 may be closed, while communication with the first connecting path 310 may be enabled. In some embodiments, the first valve 170 may be a 3-way valve.

In some embodiments, the second valve 270 may selectively have at least a first position and a second position. When the second valve 270 is in the first position, the second valve 270 may allow coolant to circulate through the second coolant loop. That is, referring to FIG. 1, a flow path toward the second pump 240 may be opened, while communication with the second connecting path 320 may be blocked. In contrast, when the second valve 270 is in the second position, the second valve 270 may allow coolant to flow toward the first point 180 through the second connecting path 320. That is, referring to FIG. 1, a flow path toward the second pump 240 may be closed, while communication with the second connecting path 320 may be enabled. In some embodiments, the second valve 270 may be a 3-way valve.

When the first valve 170 is in the second position and the second valve 270 is in the second position, the thermal management system may form the third coolant loop passing through the battery 110, the first valve 170, the heater 290, the cabin 210, and the second valve 270.

In some embodiments, the third valve 150 may selectively have at least a first position and a second position. When the third valve 150 is in the first position, the third valve 150 may allow coolant to pass through the first cooling unit 160. That is, referring to FIG. 1, a flow path toward the first cooling unit 160 may be opened, while communication with a bypass 155 connecting the third valve 150 and the first valve 170 while bypassing the first cooling unit 160 may be blocked. In contrast, when the third valve 150 is in the second position, the third valve 150 may allow coolant to bypass without passing through the first cooling unit 160. That is, referring to FIG. 1, a flow path toward the first cooling unit 160 may be closed, while communication with the bypass 155 may be enabled. In some embodiments, the third valve 150 may be a 3-way valve.

In some embodiments, the first cooling unit 160 may include a chiller 161, a radiator 163, and a fourth valve 165 disposed upstream of the chiller 161 and the radiator 163. In some embodiments, the chiller 161 may actively lower the temperature of refrigerant therewithin and achieve strong cooling through heat exchange between the low-temperature refrigerant and the coolant, while the radiator 163 may provide weaker cooling by simply facilitating heat exchange between the ambient air and the coolant. In some embodiments, the chiller 161 and the radiator 163 may be disposed in parallel. In some embodiments, the fourth valve 165 may have a first position. When the fourth valve 165 is in the first position, the fourth valve 165 may allow coolant to only pass through the radiator 163. In some embodiments, the fourth valve 165 may have a second position. When the fourth valve 165 is in the second position, the fourth valve 165 may allow coolant to only pass through the chiller 161. In some embodiments, the fourth valve 165 may have a third position. When the fourth valve 165 is in the third position, the fourth valve 165 may allow coolant to pass through both the chiller 161 and the radiator 163 in parallel. However, in some embodiments, the fourth valve 165 may have only one of the second position and the third position. (For example, the fourth valve 165 may have only the first position and the second position.)

In some embodiments, the cabin 210 may include a heat exchange promotion unit to promote heat exchange with coolant. The heat exchange promotion unit may include, for example, a fan 210*a*.

In some embodiments, the first coolant loop may be configured to sequentially pass through the battery 110, the first pump 140, the third valve 150, the first cooling unit 160, the first valve 170, and the first point 180.

In some embodiments, the second coolant loop may be configured to sequentially pass through the second point 280, the heater 290, the cabin 210, the second valve 270, and the second pump 240.

In some embodiments, the third coolant loop may be configured to sequentially pass through the battery 110, the first pump 140, the third valve 150, the first valve 170, the second point 280, the heater 290, the cabin 210, the second valve 270, and the first point 180.

As described above, the controller selects a mode based on the driver's command or the temperature information transmitted from the sensors and then controls the valves 170, 270, 150, and 165, the cooling units 160 and 260, the heater 290, and the pumps 140 and 240 to align with the selected mode.

Table 1 below illustrates examples of a variety of selectable modes and environments appropriate for the modes to be performed.

TABLE 1

|   | Battery | Cabin | Remarks |
|---|---|---|---|
| 1 | Heating | Heating | Winter, Start of Day |
| 2 | Heating | Cooling | Frost Removal in Winter |
| 3 | Heating | No Action | Fast Charging in Winter |
| 4 | Active Cooling | Cooling | Summer, After Fast Charging |
| 5 | Active Cooling | Heating | After Fast Charging in Winter |
| 6 | Active Cooling | No Action | During Fast Charging, High Load |
| 7 | Passive Cooling | Cooling | Spring, Summer |
| 8 | Passive Cooling | Heating | Autumn, Winter |
| 9 | Passive Cooling | No Action | General Temperature Range |

Hereinafter, for a better understanding, the operation of the thermal management system in first to ninth modes will be described by way of example.

Figure 2:
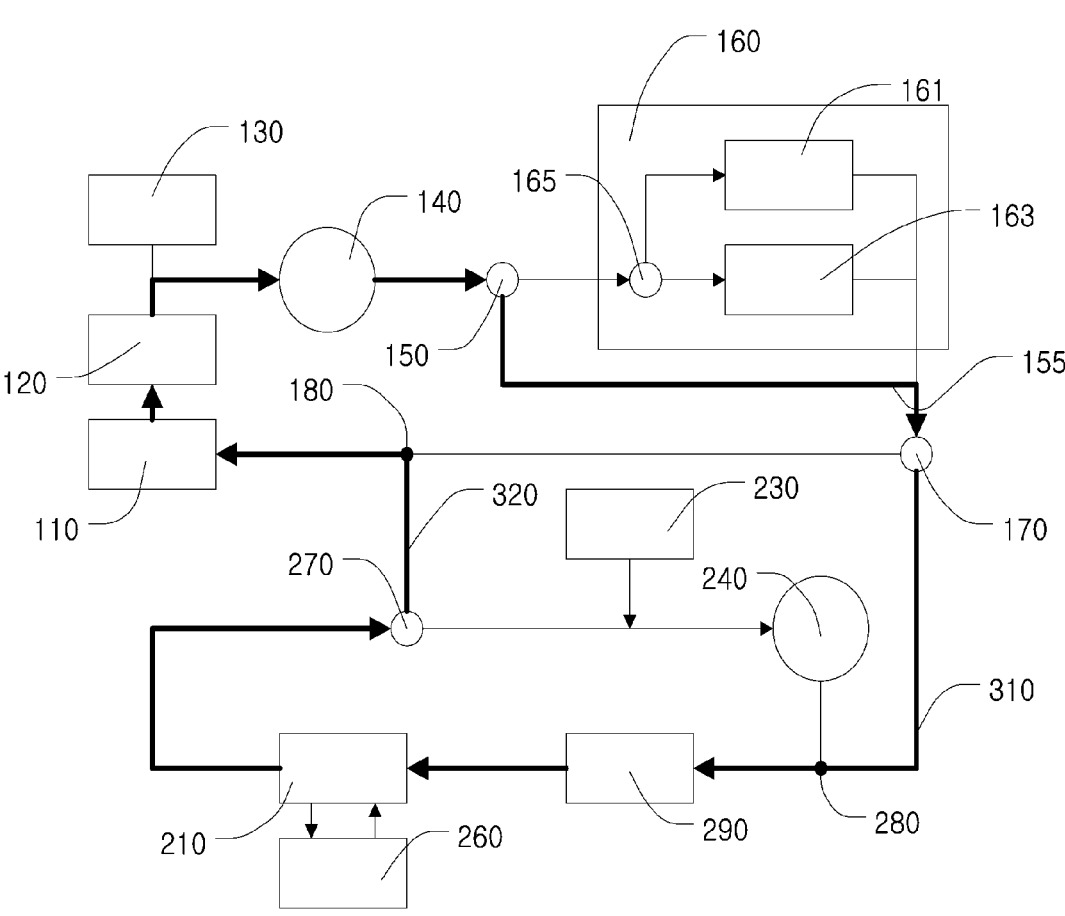
FIG. 2 is a diagram schematically illustrating the operation of heating the battery and the cabin in a first mode.

FIG. 2 is a diagram schematically illustrating the operation of heating the battery 110 and the cabin 210 in a first mode.

In the first mode, the controller may control the first valve 170 to be in the second position, the second valve 270 to be in the second position, the third valve 150 to be in the second position, stop the first cooling unit 160 from operating, control the heater 290 to operate, stop the second cooling unit 260 from operating, and stop the second pump 240.

In the first mode, coolant circulates through the third coolant loop. Referring to FIG. 2, coolant pumped by the first pump 140 may circulate through the third coolant loop by sequentially passing through the third valve 150, the first valve 170, the second point 280, the heater 290, the cabin 210, the second valve 270, the first point 180, the battery 110, and the battery charger 120. However, coolant may not pass through the first cooling unit 160 and the second pump 240.

Coolant may be heated in the heater 290, and heated coolant may heat the interior of the cabin 210 by heat exchange with the interior of the cabin 210, heat the battery 110 by heat exchange with the battery 110, and heat the battery charger 120 by heat exchange with the battery charger 120.

The controller may promote heat exchange between coolant and the interior of the cabin 210 by operating the heat exchange promotion unit (e.g., a fan 210*a*) so that a required amount of heat may be supplied to the interior of the cabin 210.

Figure 3:
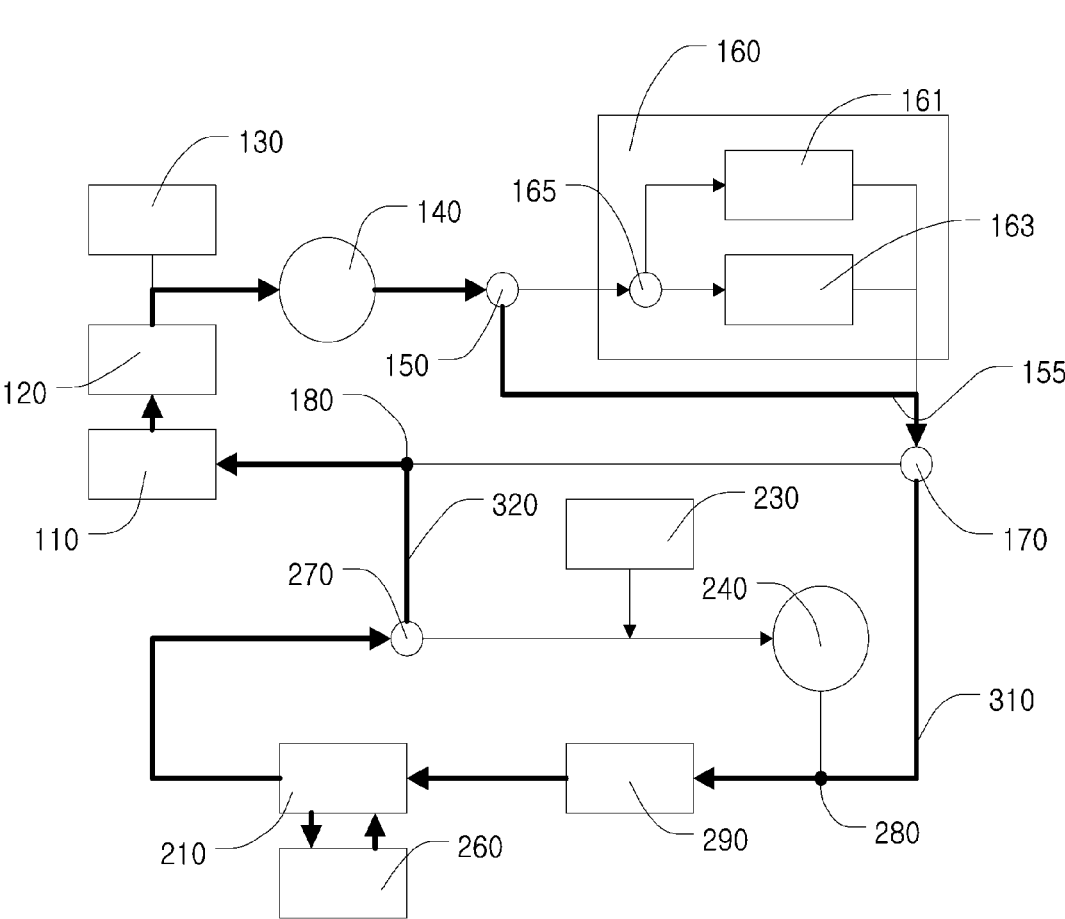
FIG. 3 is a diagram schematically illustrating the operation of heating the battery and cooling the cabin in a second mode.

FIG. 3 is a diagram schematically illustrating the operation of heating the battery 110 and cooling the cabin 210 in a second mode.

In the second mode, the controller may control the first valve 170 to be in the second position, control the second valve 270 to be in the second position, control the third valve 150 to be in the second position, stop the first cooling unit 160 from operating, control the heater 290 to operate, control the second cooling unit 260 to operate, and stop the second pump 240 from operating.

In the second mode, coolant circulates through the third coolant loop. Referring to FIG. 3, coolant pumped by the first pump 140 may circulate through the third coolant loop by sequentially passing through the third valve 150, the first valve 170, the second point 280, the heater 290, the cabin 210, the second valve 270, the first point 180, the battery 110, and the battery charger 120. However, coolant may not pass through the first cooling unit 160 and the second pump 240.

Coolant may be heated in the heater 290, and then heated coolant may heat the battery 110 by heat exchange with the battery 110 and heat the battery charger 120 by heat exchange with the battery charger 120.

The controller may minimize heat exchange between the coolant and the interior of the cabin 210 by stopping the operation of the heat exchange promotion unit. As a result, the transfer of heat from high-temperature coolant to the interior of the cabin 210 may be minimized. Instead, the second cooling unit 260 may cool the interior of the cabin 210.

Figure 4:
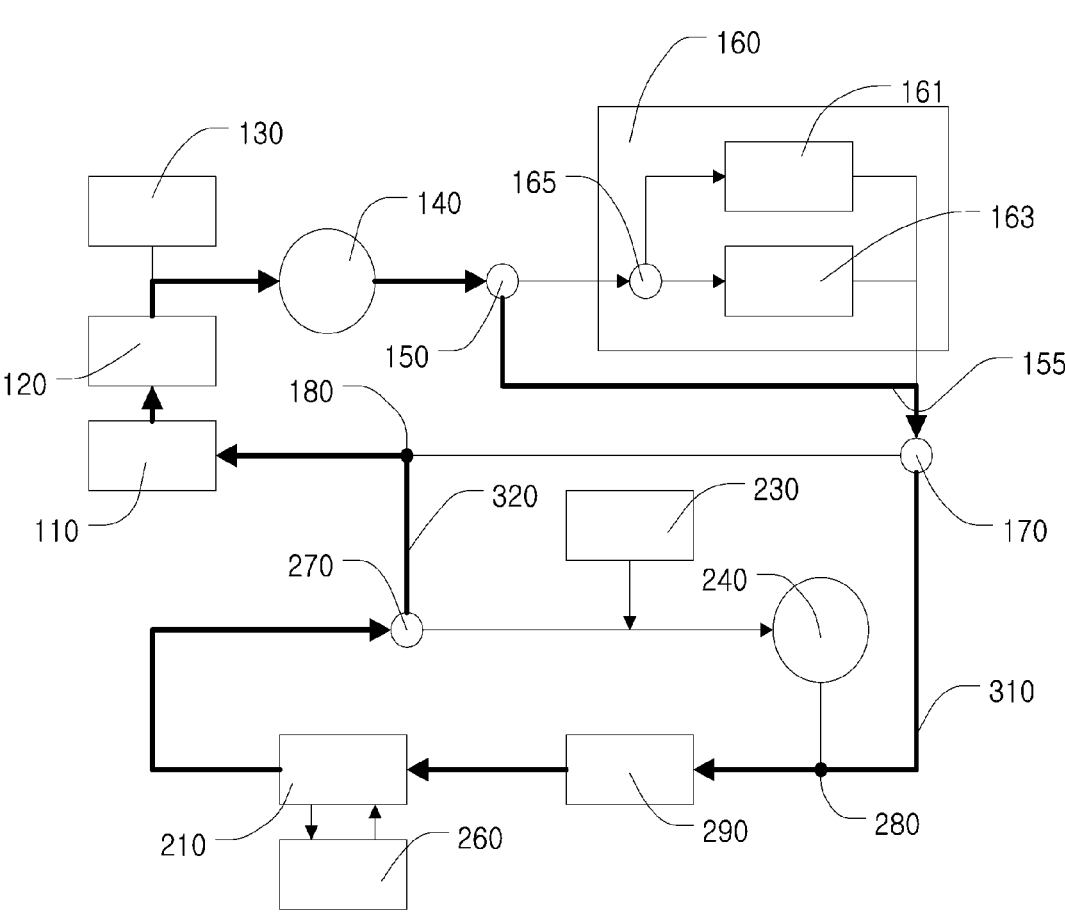
FIG. 4 is a diagram schematically illustrating the operation of heating the battery and taking no action in the cabin in a third mode.

FIG. 4 is a diagram schematically illustrating the operation of heating the battery 110 and taking no action in the cabin 210 in a third mode.

In the third mode, the controller may control the first valve 170 to be in the second position, the second valve 270 to be in the second position, the third valve 150 to be in the second position, stop the first cooling unit 160 from operating, control the heater 290 to operate, stop the second cooling unit 260 from operating, and stop the second pump 240 from operating.

Also in the third mode, coolant circulates through the third coolant loop. Referring to FIG. 4, coolant pumped by the first pump 140 may circulate through the third coolant loop by sequentially passing through the third valve 150, the first valve 170, the second point 280, the heater 290, the cabin 210, the second valve 270, the first point 180, the battery 110, and the battery charger 120. However, coolant may not pass through the first cooling unit 160 and the second pump 240.

Coolant may be heated in the heater 290, and then heated coolant may heat the battery 110 by heat exchange with the battery 110 and heat the battery charger 120 by heat exchange with the battery charger 120.

The controller may minimize heat exchange between the coolant and the interior of the cabin 210 by stopping the operation of the heat exchange promotion unit. As a result, the transfer of heat from high-temperature coolant to the interior of the cabin 210 may be minimized.

Figure 5:
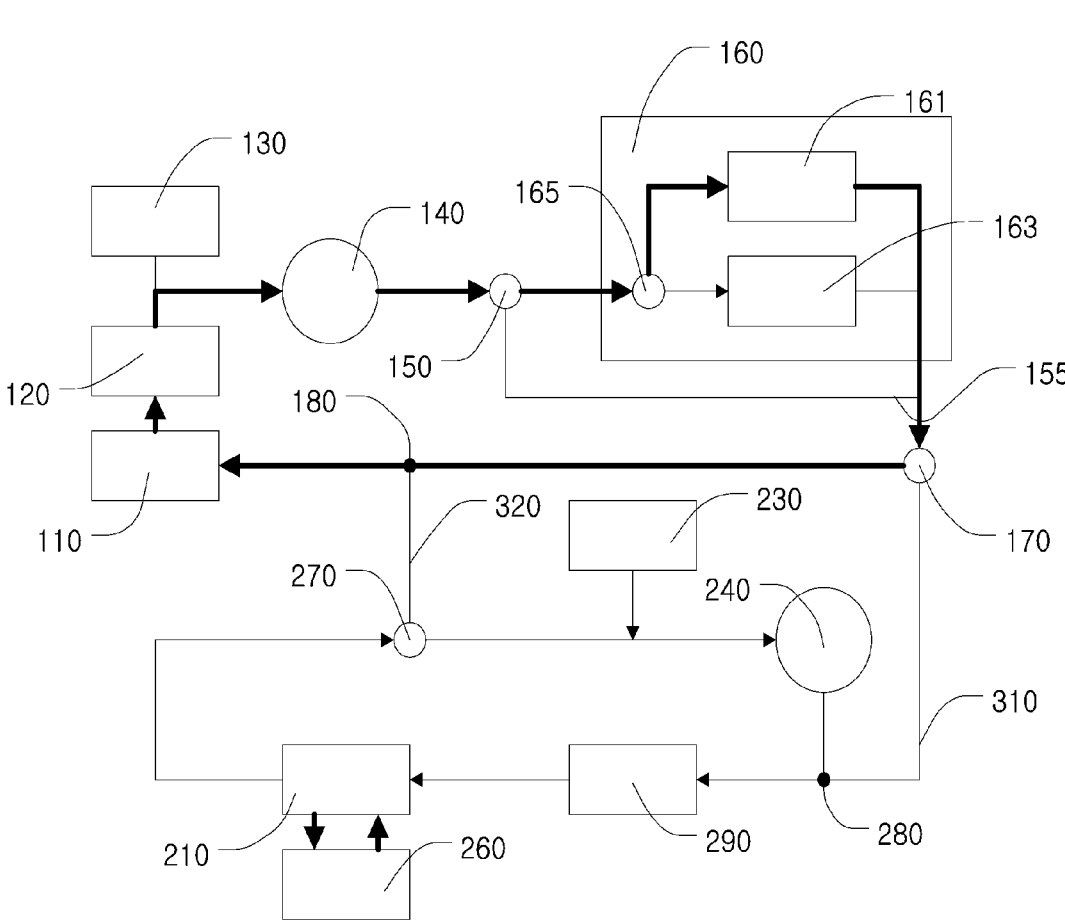
FIG. 5 is a diagram schematically illustrating the operation of actively cooling the battery and cooling the cabin in a fourth mode.

FIG. 5 is a diagram schematically illustrating the operation of actively cooling the battery 110 and cooling the cabin 210 in a fourth mode.

In the fourth mode, the controller may control the first valve 170 to be in the first position, control the second valve 270 to be in the first position, control the third valve 150 to be in the first position, stop the heater 290 from operating, control the second cooling unit 260 to operate, and stop the second pump 240 from operating.

In some embodiments, as illustrated in FIG. 5, the controller may allow coolant to only pass through the chiller 161 by shifting the fourth valve 165 to the second position. However, in some alternative embodiments, the fourth valve 165 may be shifted to the third position, thereby allowing coolant to pass through both the chiller 161 and the radiator 163 in parallel.

In the fourth mode, coolant circulates through the first coolant loop. Referring to FIG. 5, coolant pumped by the first pump 140 may circulate through the first coolant loop by passing through the third valve 150, the first cooling unit 160 (the chiller 161 in the embodiment of FIG. 5), the first valve 170, the first point 180, the battery 110, and the battery charger 120. However, coolant may not circulate through the second coolant loop.

Coolant may be strongly cooled in the first cooling unit 160, and then strongly cooled coolant may strongly cool the battery 110 by heat exchange with the battery 110 and strongly cool the battery charger 120 by heat exchange with the battery charger 120. In addition, the cabin 210 may be cooled by the second cooling unit 260.

Figure 6:
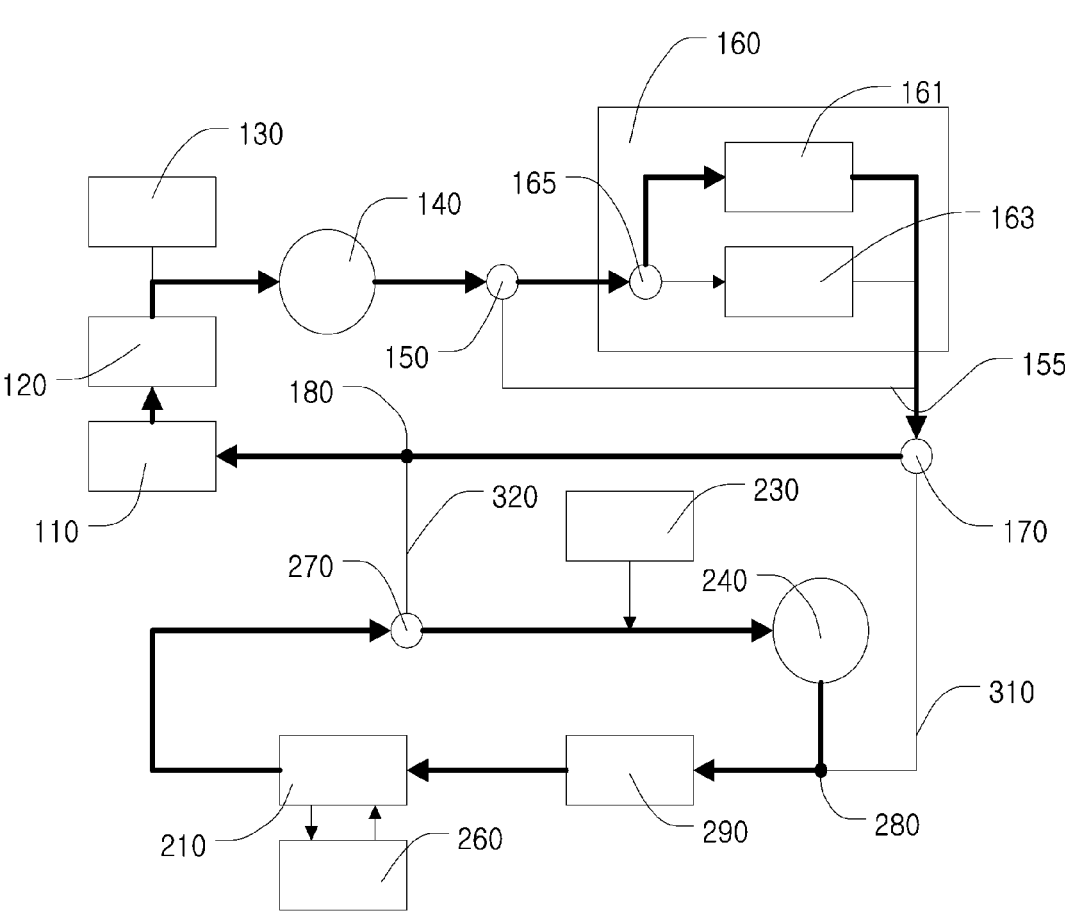
FIG. 6 is a diagram schematically illustrating the operation of actively cooling the battery and heating the cabin in a fifth mode.

FIG. 6 is a diagram schematically illustrating the operation of actively cooling the battery 110 and heating the cabin 210 in a fifth mode.

In the fifth mode, the controller may control the first valve 170 to be in the first position, control the second valve 270 to be in the first position, control the third valve 150 to be in the first position, control the heater 290 to operate, stop the second cooling unit 260 from operating, and control the second pump 240 to operate.

In some embodiments, as illustrated in FIG. 6, the controller may allow coolant to only pass through the chiller 161 by shifting the fourth valve 165 to the second position. However, in some alternative embodiments, the fourth valve 165 may be shifted to the third position, thereby allowing coolant to pass through both the chiller 161 and the radiator 163 in parallel.

In the fifth mode, coolant circulates through the first coolant loop. Referring to FIG. 6, coolant pumped by the first pump 140 may circulate through the first coolant loop by sequentially passing through the third valve 150, the first cooling unit 160 (the chiller 161 in the embodiment of FIG. 6), the first valve 170, the first point 180, the battery 110, and the battery charger 120. In addition, coolant circulates through the second coolant loop. Referring to FIG. 6, coolant pumped by the second pump 240 may circulate through the second coolant loop by sequentially passing through the second point 280, the heater 290, the cabin 210, and the second valve 270.

Coolant may be strongly cooled in the first cooling unit 160, and then strongly cooled coolant may cool the battery 110 by heat exchange with the battery 110 and strongly cool the battery charger 120 by heat exchange with the battery charger 120. In addition, coolant may be heated in the heater 290, and then heated coolant may heat the interior of the cabin 210 by heat exchange with the interior of the cabin 210. Here, the controller may promote heat exchange between the coolant and the interior of the cabin 210 by controlling the heat exchange promotion unit to operate. Thus, a required amount of heat may be supplied from coolant to the interior of the cabin 210.

Figure 7:
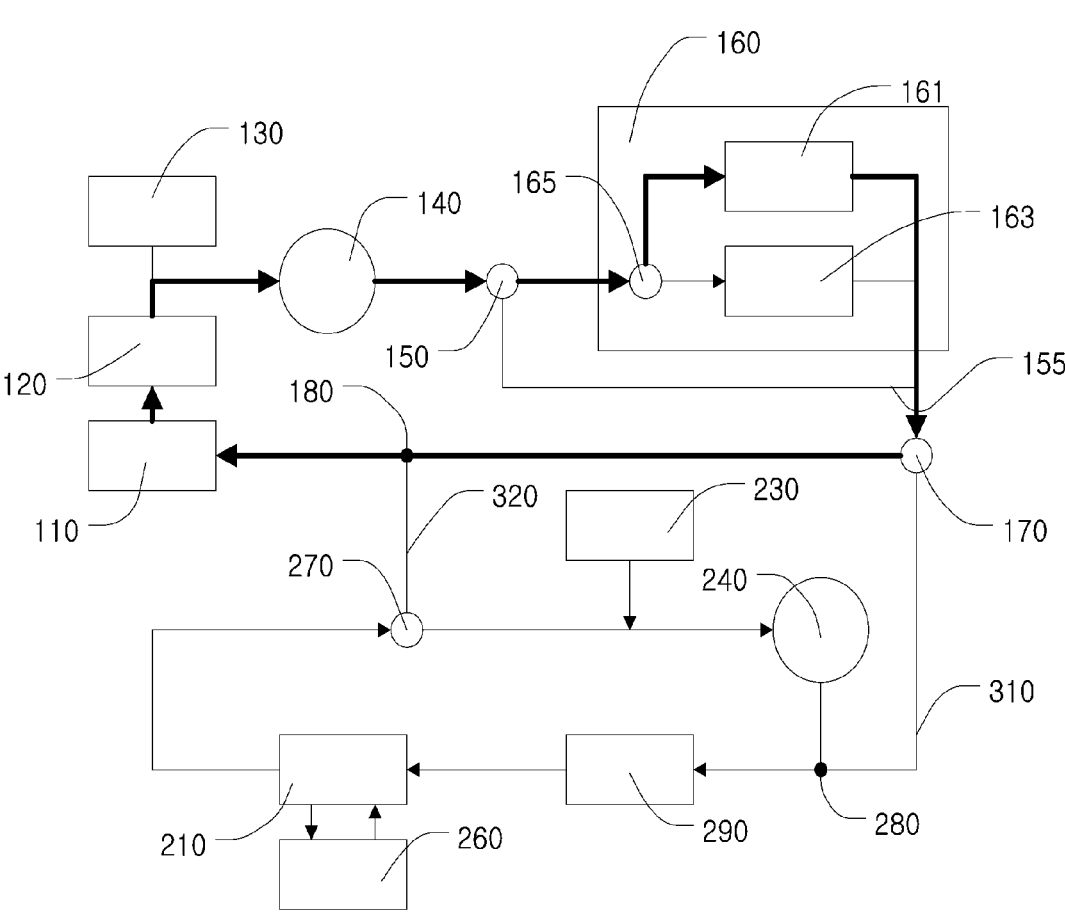
FIG. 7 is a diagram schematically illustrating the operation of actively cooling the battery and taking no action in the cabin in a sixth mode.

FIG. 7 is a diagram schematically illustrating the operation of actively cooling the battery 110 and taking no action in the cabin 210 in a sixth mode.

In the sixth mode, the controller may control the first valve 170 to be in the first position, control the second valve 270 to be in the first position, control the third valve 150 to be in the first position, stop the heater 290 from operating, stop the second cooling unit 260 from operating, and stop the second pump 240 from operating.

In some embodiments, as illustrated in FIG. 7, the controller may allow coolant to only pass through the chiller 161 by shifting the fourth valve 165 to the second position. However, in some alternative embodiments, the fourth valve 165 may be shifted to the third position, thereby allowing coolant to pass through both the chiller 161 and the radiator 163 in parallel.

In the sixth mode, coolant circulates through the first coolant loop. Referring to FIG. 7, coolant pumped by the first pump 140 may circulate through the first coolant loop by sequentially passing through the third valve 150, the first cooling unit 160 (the chiller 161 in the embodiment of FIG. 7), the first valve 170, the first point 180, the battery 110, and the battery charger 120. However, coolant may not circulate through the second coolant loop.

Coolant may be strongly cooled in the first cooling unit 160, and strongly cooled coolant may strongly cool the battery 110 by heat exchange with the battery 110 and strongly cool the battery charger 120 by heat exchange with the battery charger 120.

Figure 8:
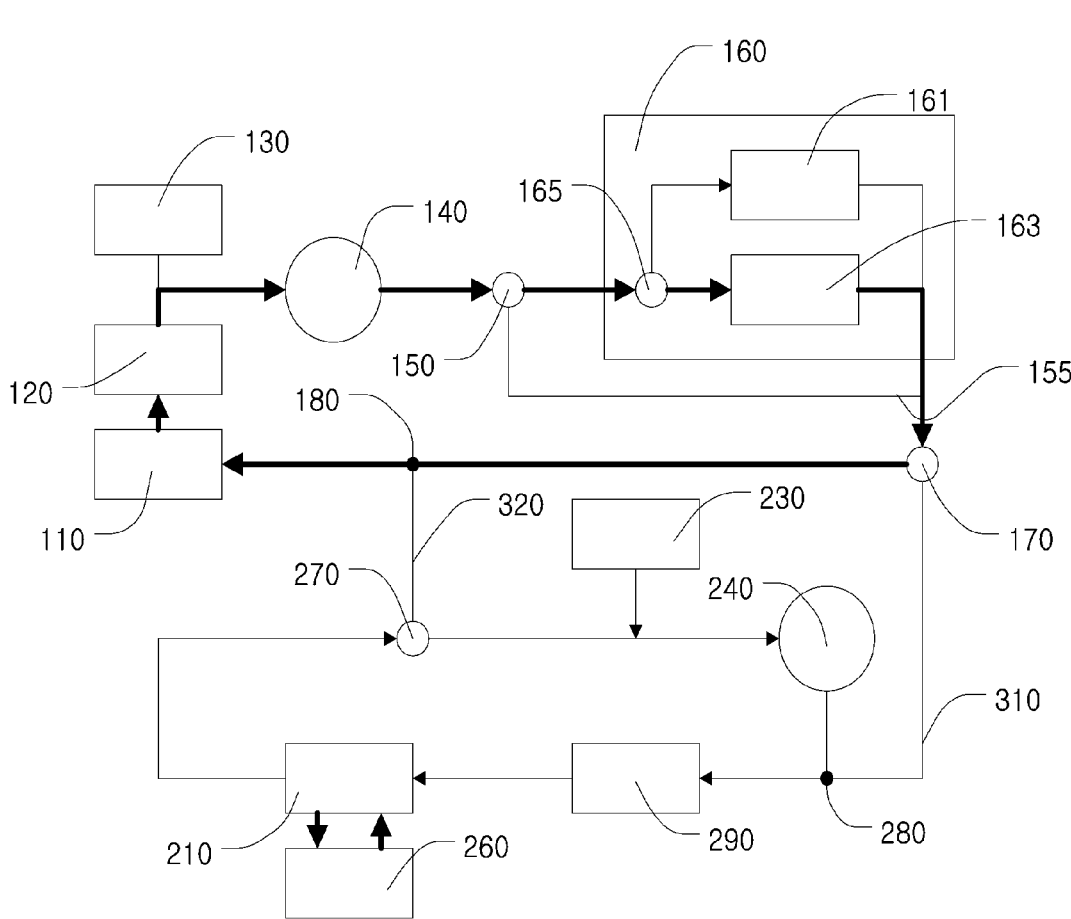
FIG. 8 is a diagram schematically illustrating the operation of passively cooling the battery and cooling the cabin in a seventh mode.

FIG. 8 is a diagram schematically illustrating the operation of passively cooling the battery 110 and cooling the cabin 210 in a seventh mode.

In the seventh mode, the controller may control the first valve 170 to be in the first position, the second valve 270 to be in the first position, the third valve 150 to be in the first position, stop the heater 290 from operating, control the second cooling unit 260 to operate, and stop the second pump 240 from operating.

In some embodiments, as illustrated in FIG. 8, the controller may allow coolant to only pass through the radiator 163 by shifting the fourth valve 165 to the first position and stop the operation of the chiller 161.

In the seventh mode, coolant circulates through the first coolant loop. Referring to FIG. 8, coolant pumped by the first pump 140 may circulate through the first coolant loop by sequentially passing through the third valve 150, the first cooling unit 160 (the radiator 163 in the embodiment of FIG. 8), the first valve 170, the first point 180, the battery 110, and the battery charger 120. However, coolant may not circulate through the second coolant loop.

Coolant may be weakly cooled in the radiator 163, and then weakly cooled coolant may weakly cool the battery 110 by heat exchange with the battery 110 and weakly cool the battery charger 120 by heat exchange with the battery charger 120. In addition, the cabin 210 may be cooled by the second cooling unit 260.

Figure 9:
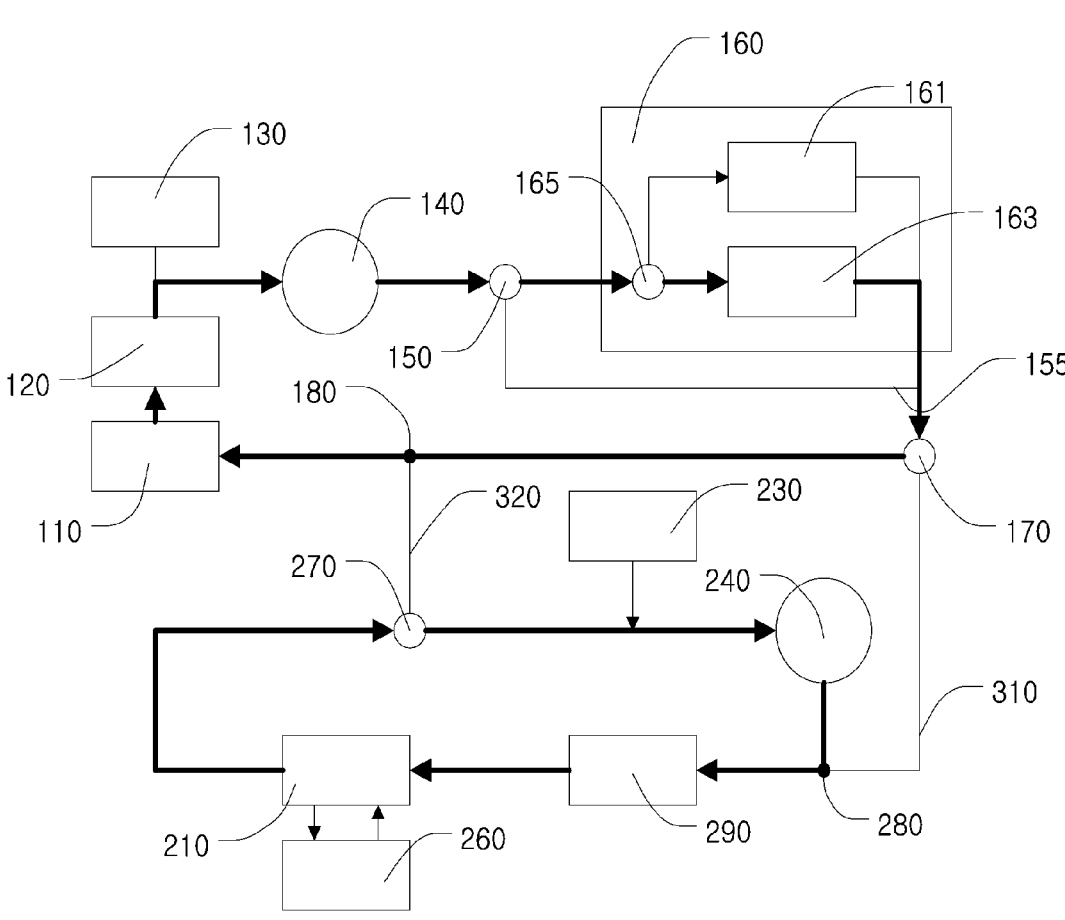
FIG. 9 is a diagram schematically illustrating the operation of passively cooling the battery and heating the cabin in an eighth mode.

FIG. 9 is a diagram schematically illustrating the operation of passively cooling the battery 110 and heating the cabin 210 in an eighth mode.

In the eighth mode, the controller may control the first valve 170 to be in the first position, control the second valve 270 to be in the first position, control the third valve 150 to be in the first position, control the heater 290 to operate, stop the second cooling unit 260 from operating, and control the second pump 240 to operate.

In some embodiments, as illustrated in FIG. 9, the controller may allow coolant to only pass through the radiator 163 by shifting the fourth valve 165 to the first position and stop the operation of the chiller 161.

In the eighth mode, coolant may circulate through the first coolant loop. Referring to FIG. 9, coolant pumped by the first pump 140 may circulate through the first coolant loop by sequentially passing through the third valve 150, the first cooling unit 160 (the radiator 163 in the embodiment of FIG. 9), the first valve 170, the first point 180, battery 110, and the battery charger 120. In addition, coolant may circulate through the second coolant loop. Referring to FIG. 9, coolant pumped by the second pump 240 may circulate through the second coolant loop by sequentially passing through the second point 280, the heater 290, the cabin 210, and the second valve 270.

Coolant may be weakly cooled in the radiator 163, and then weakly cooled coolant may weakly cool the battery 110 by heat exchange with the battery 110 and weakly cool the battery charger 120 by heat exchange with the battery charger 120. In addition, coolant may be heated in the heater 290, and then heated coolant may heat the interior of the cabin 210 by heat exchange with the interior of the cabin 210. Here, the controller may promote heat exchange between the coolant and the interior of the cabin 210 by operating the heat exchange promotion unit. Thus, a required amount of heat may be supplied from high-temperature coolant to the interior of the cabin 210.

Figure 10:
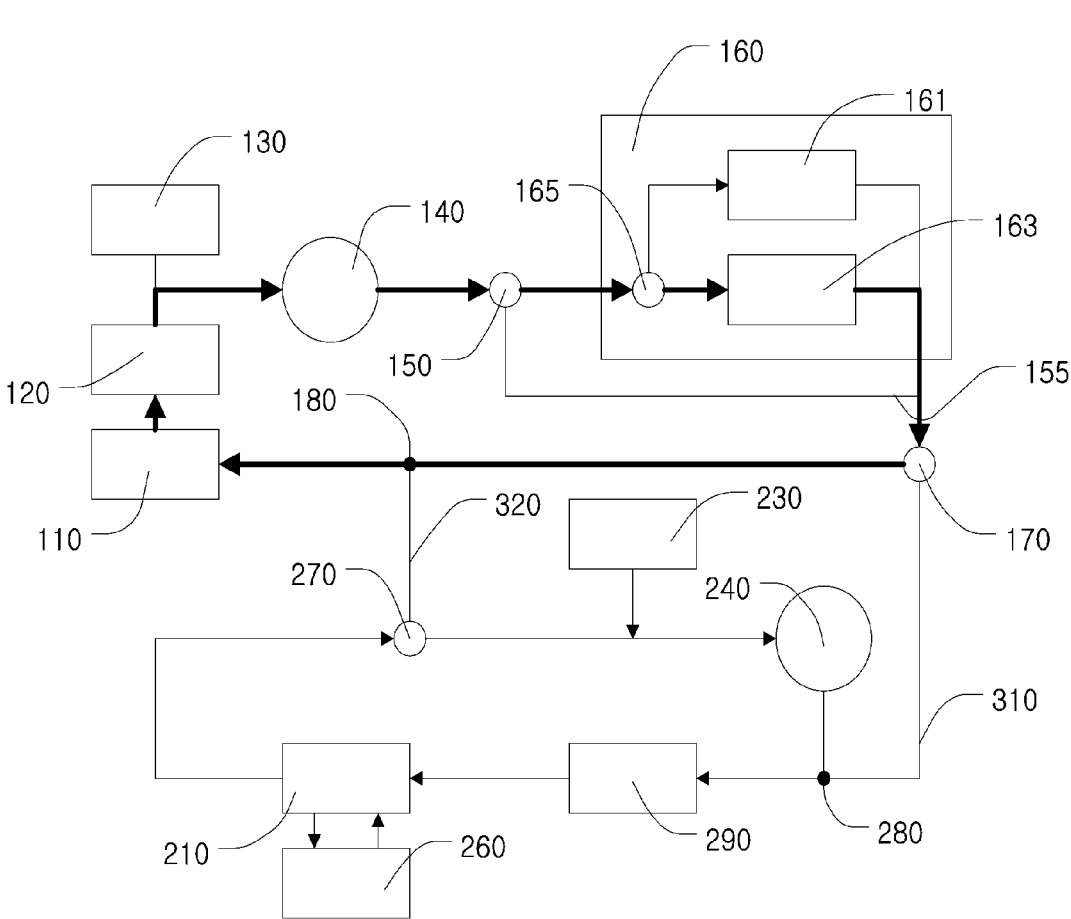
FIG. 10 is a diagram schematically illustrating the operation of passively cooling the battery and taking no action in the cabin in a ninth mode.

FIG. 10 is a diagram schematically illustrating the operation of passively cooling the battery 110 and taking no action in the cabin 210 in a ninth mode.

In the ninth mode, the controller may control the first valve 170 to be in the first position, control the second valve 270 to be in the first position, control the third valve 150 to be in the first position, stop the heater 290 from operating, stop the second cooling unit 260 from operating, and stop the second pump 240 from operating.

In some embodiments, as illustrated in FIG. 10, the controller may allow coolant to only pass through the radiator 163 by shifting the fourth valve 165 to the first position and stop the operation of the chiller 161.

In the ninth mode, coolant may circulate through the first coolant loop. Referring to FIG. 10, coolant pumped by the first pump 140 may circulate through the first coolant loop by sequentially passing through the third valve 150, the first cooling unit 160 (the radiator 163 in the embodiment of FIG. 10), the first valve 170, the first point 180, the battery 110, and the battery charger 120. However, coolant may not circulate through the second coolant loop.

Coolant may be weakly cooled in the radiator 163, and then weakly cooled coolant may weakly cool the battery 110 by heat exchanged with the battery 110 and weakly cool the battery charger 120 by heat exchanged with the battery charger 120.

Some alternative embodiments may include a battery no-action mode. When the battery is in this mode, the cabin may set to one of a cooling mode, a heating mode, and a no action mode. In the battery no-action mode, the controller may control the first valve 170 to be in the first position, the second valve 270 to be in the first position, and the third valve 150 to be in the second position.

What is claimed is:

1. A vehicle thermal management system comprising:
a first coolant loop configured to pass through all of a battery supplying power to a vehicle, a first valve, a first pump, a third valve, and a first cooling unit;
a second coolant loop configured to pass through all of a heater, a cabin, a second valve and a second pump;
a first connecting path connecting the first valve and a second point of the second coolant loop;
a second connecting path connecting the second valve and a first point of the first coolant loop;
a first tank supplying coolant to the first coolant loop;
a second tank supplying coolant to the second coolant loop; and
a second cooling unit configured to cool the cabin,
wherein the first valve selectively has at least a first position and a second position, allows coolant to circulate through the first coolant loop when the first valve is in the first position, and allows coolant to flow to the second point through the first connecting path when the first valve is in the second position,
the second valve selectively has at least a first position and a second position, allows coolant to circulate through the second coolant loop when the second valve is in the first position, and allows coolant to flow to the first point through the second connecting path when the second valve is in the second position,
the third valve selectively has at least a first position and a second position, allows coolant to pass through the first cooling unit when the third valve is in the first position, and allows coolant to bypass the first cooling unit when the third valve is in the second position,
the first coolant loop is configured to sequentially pass through the third valve, the first cooling unit, the first valve, the first point, and the battery, and
the second coolant loop is configured to sequentially pass through the second pump, the second point, the heater, the cabin, and the second valve.

2. The vehicle thermal management system of claim 1, further comprising a controller,
wherein, in a battery-heating/cabin-heating mode, the controller:
controls the first valve to be in the second position;
controls the second valve to be in the second position;
controls the third valve to be in the second position;
stops the first cooling unit from operating;
controls the heater to operate;
stops the second cooling unit from operating; and
stops the second pump from operating.

3. The vehicle thermal management system of claim 2, wherein the cabin comprises a fan configured to promote heat exchange between the cabin and coolant, and
the controller controls the fan to operate in the cabin-heating mode and stops the fan from operating in the cabin-cooling mode and the cabin-no-action mode.

4. The vehicle thermal management system of claim 2, further comprising a sensor configured to measure the temperature of the battery, wherein the controller controls each of the first valve, the second valve, the third valve, and the heater based on the temperature measured by the sensor.

5. The vehicle thermal management system of claim 1, further comprising a controller, wherein, in a battery-heating/cabin-cooling mode, the controller:

controls the first valve to be in the second position;

controls the second valve to be in the second position;

controls the third valve to be in the second position;

stops the first cooling unit from operating;

controls the heater to operate;

controls the second cooling unit to operate; and stops the second pump from operating.

6. The vehicle thermal management system of claim 1, further comprising a controller, wherein, in a battery-heating/cabin-no-action mode, the controller:

controls the first valve to be in the second position;

controls the second valve to be in the second position;

controls the third valve to be in the second position;

stops the first cooling unit from operating;

controls the heater to operate;

stops the second cooling unit from operating; and stops the second pump from operating.

7. The vehicle thermal management system of claim 1, further comprising a controller, wherein, in a battery-active-cooling/cabin-cooling mode, the controller:

controls the first valve to be in the first position;

controls the second valve to be in the first position;

controls the third valve to be in the first position;

stops the heater from operating;

controls the second cooling unit to operate; and stops the second pump from operating.

8. The vehicle thermal management system of claim 7, wherein the first cooling unit comprises a chiller, a radiator, and a fourth valve disposed upstream of the chiller and the radiator, and in the battery-active-cooling mode, the controller controls the fourth valve to allow coolant to either pass through the chiller and the radiator or to only pass through the chiller, and controls the chiller to operate.

9. The vehicle thermal management system of claim 1, further comprising a controller, wherein, in a battery-active-cooling/cabin-heating mode, the controller:

controls the first valve to be in the first position;

controls the second valve to be in the first position;

controls the third valve to be in the first position;

controls the heater to operate;

stops the second cooling unit from operating; and controls the second pump to operate.

10. The vehicle thermal management system of claim 1, further comprising a controller, wherein, in a battery-active-cooling/cabin-no-action mode, the controller:

controls the first valve to be in the first position;

controls the second valve to be in the first position;

controls the third valve to be in the first position;

stops the heater from operating;

stops the second cooling unit from operating; and stops the second pump from operating.

11. The vehicle thermal management system of claim 1, further comprising a controller, wherein, in a battery-passive-cooling/cabin-cooling mode, the controller:

controls the first valve to be in the first position;

controls the second valve to be in the first position;

controls the third valve to be in the first position;

stops the heater from operating;

controls the second cooling unit to operate; and stops the second pump from operating.

12. The vehicle thermal management system of claim 11, wherein the first cooling unit comprises a chiller, a radiator, and a fourth valve disposed upstream of the chiller and the radiator, and in the battery-passive-cooling mode, the controller controls the fourth valve to allow coolant to only pass through the radiator, and stops the chiller from operating.

13. The vehicle thermal management system of claim 1, further comprising a controller, wherein, in a battery-passive-cooling/cabin-heating mode, the controller:

controls the first valve to be in the first position;

controls the second valve to be in the first position;

controls the third valve to be in the first position;

controls the heater to operate;

stops the second cooling unit from operating; and controls the second pump to operate.

14. The vehicle thermal management system of claim 1, further comprising a controller, wherein, in a battery-passive-cooling/cabin-no-action mode, the controller:

controls the first valve to be in the first position, controls the second valve to be in the first position, controls the third valve to be in the first position, stops the heater from operating, stops the second cooling unit from operating, and stops the second pump from operating.

15. The vehicle thermal management system of claim 1, further comprising a controller, wherein in a battery-no-action mode, the controller:

controls the first valve to be in the first position;

controls the second valve to be in the first position; and controls the third valve to be in the second position.

\* \* \* \* \*